United States Patent Office 2,786,463
Patented Mar. 26, 1957

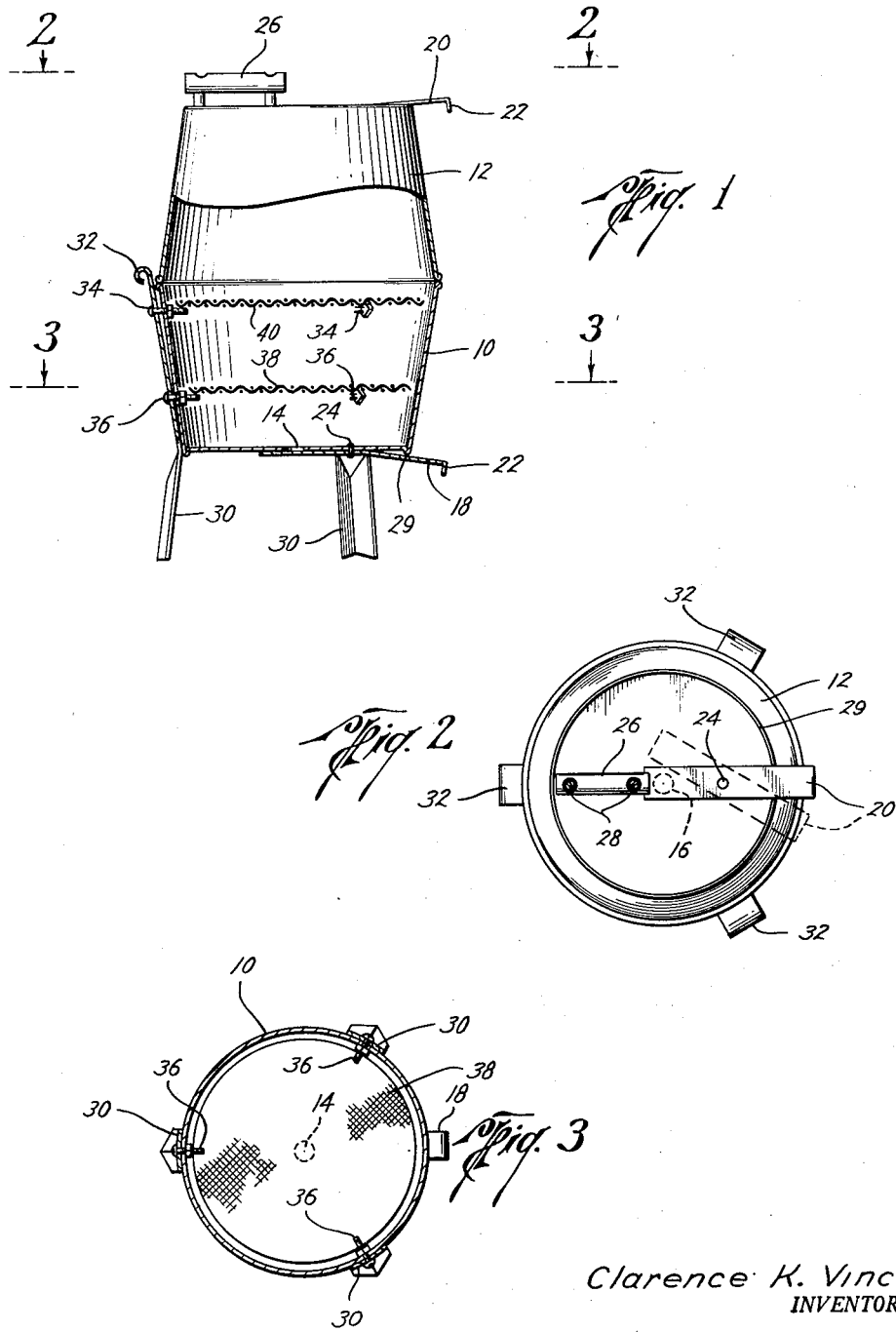

2,786,463

COOKING APPARATUS

Clarence K. Vincent, Houston, Tex.

Application October 22, 1953, Serial No. 387,634

3 Claims. (Cl. 126—25)

This invention relates to cooking apparatus and more particularly to a combined broiler and oven which may be used in various ways in the cooking of numerous kinds of food.

While not limited to such use the invention finds particular application in the barbecuing of meat, employing charcoal as a fuel with or without the addition of suitable smoke producing substances, such as hickory wood, for imparting to the meat a desirable smoky flavor.

The invention has for its chief object the provision of cooking apparatus which may be used as a grill of the open type or which may be employed as an oven for broiling or roasting.

Another object of the invention is to provide cooking apparatus of the kind referred to which is of compact design and rugged construction and which may be easily carried about from one place to another for use in any desired location.

A further object of the invention is the provision of a combined broiler and oven having an open topped body arranged to contain fuel, and provided with a grill upon which food may be placed for broiling, which body is supported on legs whose upper ends extend above the top of the body to serve as guiding and retaining means for holding a cover in place on the body when the device is to be used as an oven.

A still further object of the invention is to provide cooking apparatus including a body provided with legs which also serve as positioning and retaining means for a cover and in which the legs are secured to the body by means extending into the interior of the body to serve as supports for fuel and food supporting grids within the body.

The above and other important objects and advantages of the invention will best be understood from the following detailed description constituting a specification of the same when considered in conjunction with the annexed drawings, wherein—

Figure 1 is a side elevational view of the invention, partly broken away and partly in cross-section;

Figure 2 is a top plan view of the same as illustrated in Figure 1; and

Figure 3 is a cross-sectional view, taken along the line 3—3 of Figure 1, looking in the direction indicated by the arrows.

Referring now to the drawings in greater detail, the invention comprises a body 10, which takes the form of an open topped receptacle of generally cylindrical configuration, upon which a cover 12 may be removably positioned, which cover, in the present illustration, is of substantially the same size and configuration as that of the body. The body and cover may be of conical shape, or otherwise, and each is provided with a suitable air circulation opening, such as those indicated at 14, and 16, respectively, which openings are positioned to be closed by suitable dampers 18 and 20, respectively. Each of the dampers 18 and 20 is conveniently formed of a flat strip of metal having a down-turned outer end portion 22, and is pivotally secured to the respective part of the apparatus, mediate its ends by means of a rivet 24, or the like, whereby the damper may be readily moved to regulate the flow of air through the opening in any desired manner. The cover 12 may also be provided with a handle 26, secured thereto in any suitable manner, as by means of bolts 28, and which handle preferably extends radially of the cover, in position to be readily grasped by the user, whereby the cover may be easily tilted and lifted off of the body, or placed in position thereon.

The receptacle 10 and cover 12 may be formed with rim portions or chimes 29, over which the dampers 18 and 20 extend in frictional contact with the chimes, whereby accidental movement of the dampers is prevented and the dampers are frictionally retained in any position of adjustment.

The body 10 is supported on a number of legs 30, three such legs being shown in the present illustration, which legs extend downwardly below the bottom of the body, and also project upwardly beyond the top thereof, the upper ends of the legs being outwardly rolled, as indicated in Figures 1 and 2 to form guides 32 with which the cover 12 is engageable to guide and position the cover into substantial registration with the top of the body and retain the cover against lateral displacement relative to the body when placed thereon. The lower portions of the leg 30, extending below the bottom of the body 10 may be V-shaped in cross section, or otherwise corrugated or shaped to increase their strength, and if desired the legs may slope outwardly away from the bottom of the body, to impart greater stability to the structure.

As best seen in the Figures 1 and 3 of the drawings, the legs 30 extend upwardly along the upright wall of the body, and may be secured thereto by suitable means, such as the bolts, indicated at 34 and 36 which bolts extend through the legs and the wall of the body, and project inwardly into the interior thereof.

Within the body 10 a fuel supporting grate 38 is carried on the inner end portions of the lower bolts 36, and above this grate a food supporting grid 40 is likewise carried on the inner end portions of the upper bolts 34 in vertically spaced relation to the grate. The grate is preferably positioned above the bottom of the body, in a location to permit the free access of air through the opening 14 to the fuel supported on the grate, and the grid 40 is located at such a distance above the grate as to provide efficient heating of the food placed thereon. It will be noted that the fastening elements 34 and 36 perform a dual function, in securing the legs 30 to the body 10, and also in supporting the grate and grid in the interior of the body. The grate and grid may rest upon the bolts 36 and 34, without being attached thereto, so that they may be readily removed and replaced when desired.

In making use of the apparatus, constructed as described above, the cover 12 is removed from the body and the grid 40 lifted out, whereupon a suitable quantity of fuel, such as charcoal, may be placed on the grate 38 and ignited in any suitable manner. By adjusting the damper 18 the amount of air admitted through the opening 14 in the bottom of the body may be regulated to control the combustion of the fuel.

By replacing the grid 40 in the body, food may be placed thereon, with the cover 12 removed, for the purpose of broiling the same, or when desired the cover 12 may be placed in position on the body, in the manner indicated in Figure 1 of the drawings, whereby the apparatus may be used as an oven. By adjusting the damper 20 of the cover the amount of air which passes through the fuel may be regulated, so that the food may be thoroughly roasted with little danger of becoming ignited, and any fat or grease which may fall from the food onto the fuel is prevented from burning with a flame which might cause the food to be burned.

Should it be desired to extinguish the fire after the food has been cooked both of the dampers 18 and 20 may be closed, whereupon the fuel will be rapidly extinguished, and the unused portion may thus be saved for future operation of the apparatus.

It will be apparent that the cover 12 will be guided into proper position by engagement with the guides 32, when lowering the cover onto the body, and when the cover is in place the guide will serve to prevent accidental displacement of the cover from the body.

By removing the grate 38 and grid 40, and placing them inside of the cover 12, the cover may be inverted and partially nested into the body, thus forming a compact arrangement of the parts for easy transportation or storage.

It will thus be seen that the invention provides a combined broiler and oven which is of simple design and economical manufacture, and by which various kinds of food may be cooked in a number of different ways.

While the invention has been disclosed herein in connection with a certain specific embodiment of the same, it will be understood that this is intended by way of illustration only, and that numerous changes can be made in the construction and arrangement of the various parts without departing from the spirit of the invention, or the scope of the appended claims.

Having thus clearly shown and described the invention what is claimed as new and desired to secure by Letters Patent is:

1. Cooking equipment comprising an open-topped receptacle, a cover shaped to be loosely positioned on the top of the receptacle to close the receptacle, upright supports each formed in one piece extending below the bottom of the receptacle and forming legs for the same, said supports extending upwardly above the top of the receptacle in position to be engaged by said cover to guide the cover into closing position, fastening elements securing the supports to the exterior of the receptacle and extending within the receptacle at points spaced above the bottom of the receptacle, and grate means supported on said elements in the receptacle.

2. Cooking equipment comprising an open-topped receptacle, a cover shaped to be loosely positioned on the top of the receptacle to close the receptacle, upright supports each formed in one piece extending below the bottom of the receptacle and forming legs for the same, said supports extending upwardly above the top of the receptacle in position to be engaged by said cover to guide the cover into closing position, upper and lower fastening elements securing the uprights to the exterior of the receptacle and extending within the receptacle at points spaced above the bottom of the receptacle, grate means supported in the receptacle on said lower elements and grid means in the receptacle supported on said upper elements.

3. Cooking equipment comprising an open-topped receptacle, a cover shaped to be loosely positioned on the top of the receptacle to close the receptacle, said receptacle and cover having openings therein, damper means on the receptacle and cover for regulating said openings, upright supports each formed in one piece disposed exteriorly of the receptacle and extending below the bottom of the receptacle to form legs for the same and having outwardly rolled upper end portions extending above the top of the receptacle in position to be engaged by the cover to guide the cover into closing position, said upper end portions being engageable with the cover in the closed position of the cover to hold the cover against lateral displacement on the receptacle, fastening elements securing the uprights to the receptacle at points above the bottom of the receptacle and fuel and food supporting members positioned in the receptacle supported on said elements in vertically spaced relation.

References Cited in the file of this patent

UNITED STATES PATENTS

| | | |
|---|---|---|
| 222,676 | Dembrun | Dec. 16, 1879 |
| 230,889 | Norcross | Aug. 10, 1880 |
| 594,645 | Nordinger | Nov. 30, 1897 |
| 1,472,178 | Klein | Oct. 30, 1923 |
| 1,677,593 | McEwan | July 17, 1928 |
| 1,725,521 | Keiner | Aug. 20, 1929 |
| 1,955,147 | Remington | Apr. 17, 1934 |
| 2,631,750 | Laucks | Mar. 17, 1953 |
| 2,641,243 | Goss | June 9, 1953 |
| 2,645,993 | Voss | July 21, 1953 |